June 17, 1930.     F. M. OSGOOD     1,763,814
TRICK EGG TOY
Filed March 13, 1930.
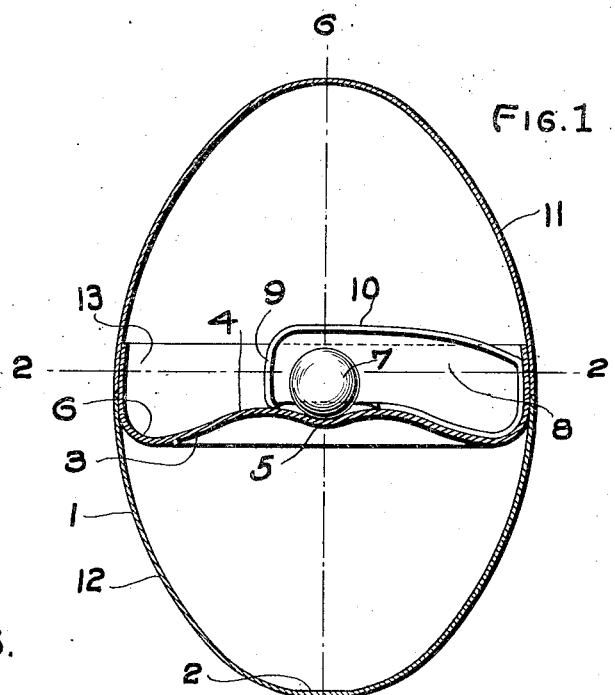
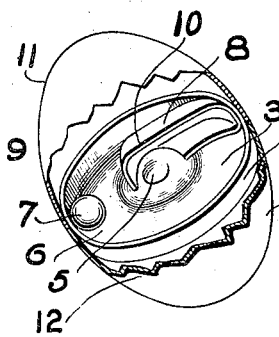
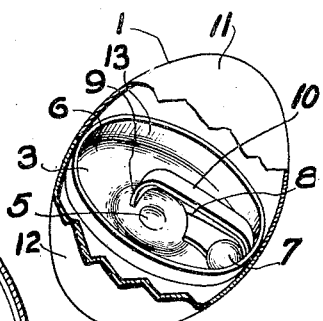
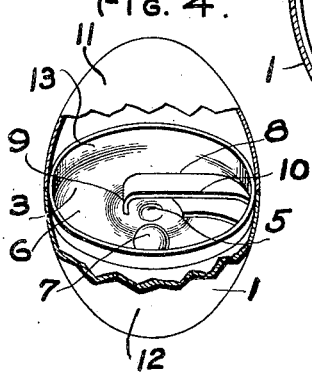
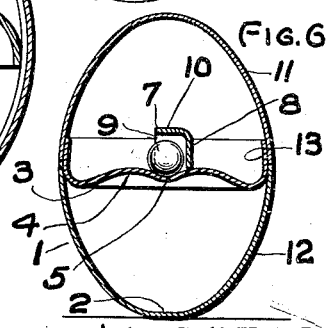
INVENTOR.
Frederick M. Osgood
BY
Heard Smith & Tennant.
ATTY'S Patented June 17, 1930

1,763,814

UNITED STATES PATENT OFFICE

FREDERICK M. OSGOOD, OF BOSTON, MASSACHUSETTS, ASSIGNOR TO TILTON & COOK CO., OF LEOMINSTER, MASSACHUSETTS, A CORPORATION OF MASSACHUSETTS

TRICK EGG TOY

Application filed March 13, 1930. Serial No. 435,400.

This invention relates to trick toys and particularly to a toy or puzzle having the form of an egg which is so constructed that when it is properly manipulated it can be made to stand on its end.

In order to give an understanding of the invention, I have illustrated in the drawings a selected embodiment thereof which will now be described, after which the novel features will be pointed out in the appended claims.

In the drawings:

Fig. 1 is a sectional view of a trick egg embodying my invention.

Fig. 2 is a section on the line 2—2 of Fig. 1.

Figs. 3, 4, 5, and 6 illustrate how the egg may be manipulated to make it stand on end, Fig. 6 being a reduced section on the line 6—6 of Fig. 1.

The device comprises a hollow body 1 having the form of an egg, said body being preferably flattened slightly at one end, as shown at 2.

The hollow body is provided with a transverse partition 3, the central portion of which is raised slightly, as shown at 4, the raised portion being provided with a slight depression 5 in the axial line of the egg. This construction forms a runway 6 at the peripheral portion of the partition in which travels a ball or weight 7. The solution of the trick is to get the ball or weight 7 in the central depression 5. When the ball or weight is located in this central depression 5, the egg will be perfectly balanced, so that it will readily stand on its flattened end 2. When, however, the ball is located in the runway 6, the egg will be unbalanced and will not stand on its end.

In order to direct the ball into the central depression 5 when the egg is properly manipulated, there is provided a deflector member 8 which rises from the partition 3 and extends from the side wall of the body 1 toward the center and terminates adjacent the depression 5. This deflector member is made concave on the side facing the depression 5 and it is formed at its inner end with a stop flange 9 which is situated just beyond the depression 5. This deflector member is also made with the overhanging portion 10 along its upper edge so that it forms a trough which is set on edge.

Normally the ball or weight 7 will be occupying the runway 6, as a result of which the egg will be unbalanced. In order to set the egg on end, it is manipulated so as to cause the ball to run around the runway into the trough-like deflector 8 and the egg is then further tilted or manipulated so that the weight or ball will run along the trough-like deflector from the outer end to the inner end until it meets the stop flange 9. The egg is then simply turned into an upright position and the ball will roll into the central depression 5, thereby bringing the egg into a balanced condition. If, now, the egg is set on its lower flat end 2, it will remain in an upright position, as shown in Fig. 1.

The manner of manipulating the egg to cause it to stand on end is illustrated in Figs. 3, 4, 5 and 6. The egg will first be tilted into an inclined position such as shown in Fig. 3 so as to maintain the ball in the runway 6 and then with the egg still held in an inclined position, it is turned or manipulated as shown in Figs. 4 and 5 so that the ball will roll around the runway 6 into a position against the outer end of the deflector 8. The egg is then tipped so that the ball will roll into the deflector 8 and with the ball in said deflector the egg is tipped again to cause the ball to roll along the deflector against the stop 9. When the ball is in this position the turning of the ball into a vertical position shown in Figs. 1 and 3 will cause the ball to roll into the depression 5 thus balancing the egg so that it may be placed on its flat end 2.

In making the toy, it will be convenient to make the egg body in two parts, 11 and 12, and to make the partition member 3 as a separate part. The partition member 3 is shown as being formed with the upstanding rim 13 which fits within the lower part 12 of the egg body, the top of the rim projecting slightly above the top of the lower part of the egg. The lower edge of the upper part 11 of the egg fits over this extended portion of the rim 13. The different parts of the egg can be secured together by suitable adhesive or in any other approved way.

The egg may be made of any desirable material, although I have found that celluloid makes an eminently satisfactory material for this purpose.

I claim:

1. A trick egg comprising a hollow body portion having the shape of an egg and flattened at one end, a dome-shaped partition extending transversely across the body portion and provided at its center with a depression, a deflecting member rising from the partition and extending from the side wall of the body to a point just beyond and at one side of said depression, said deflecting member having a stop flange at its inner end and a ball supported on said partition and adapted when the body is properly manipulated to roll against the deflector and along the latter to the stop flange and then into the central depression.

2. A trick egg comprising a hollow body portion having the shape of an egg and flattened at one end, a dome-shaped partition extending transversely across the body portion and provided at its center with a depression, a deflecting member rising from the partition and extending from the side wall of the body to a point just beyond and at one side of said depression, said deflector being of trough shape with the concave face toward the central depression and having a stop flange at its inner end and a ball supported on said partition and adapted when the body is properly manipulated to roll against the deflector and along the latter to the stop flange and then into the central depression.

In testimony whereof, I have signed my name to this specification.

FREDERICK M. OSGOOD.